A. ROSS.
Harrow.
No. 164,042.
Patented June 1, 1875.
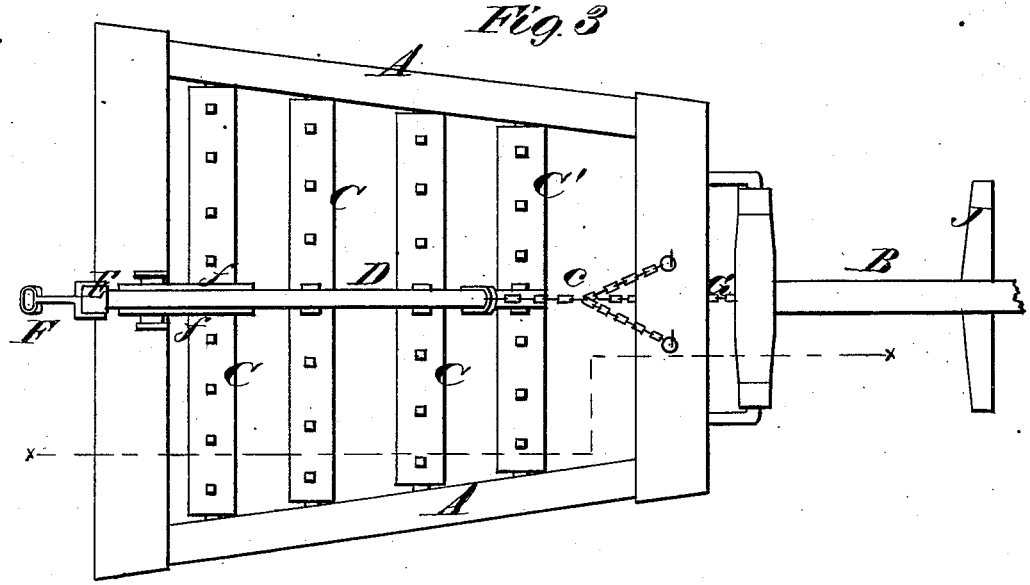

UNITED STATES PATENT OFFICE.

AYRES ROSS, OF VICTOR, IOWA.

IMPROVEMENT IN HARROWS.

Specification forming part of Letters Patent No. 164,042, dated June 1, 1875; application filed March 6, 1875.

*To all whom it may concern:*

Be it known that I, AYRES ROSS, of Victor, in the county of Poweshiek and State of Iowa, have invented a new and valuable Improvement in Harrows; and I do hereby declare that the following is a full, clear, and exact description of the construction and operation of the same, reference being had to the annexed drawings making a part of this specification, and to the letters and figures of reference marked thereon.

Figures 1 and 2 of the drawings are representations of longitudinal sections of my harrow, and Fig. 3 is a plan view of the same.

This invention has relation to harrows; and it consists in applying in a suitable frame a number of bars, which are allowed to oscillate, and which have the harrow-teeth fixed in them, in combination with means for holding the teeth in working position, and adjusting them out of such position, as will be hereinafter explained.

In the annexed drawings, A designates a quadrangular frame, to the front end of which a draft-pole, B, is pivoted. To the side bars of the frame A cross-bars C are pivoted, so that they are free to oscillate about their longitudinal axes, and in these bars C harrow-teeth *a* are fixed. D designates a bar which is pivoted to standards *b* rising from the bars C, and which connects all these bars together. The front end of connecting-bar D is attached to the front cross-bar of frame A by means of a chain, *c*, which prevents the teeth *a* from being pitched too far backward. The rear end of the connecting-bar D is attached to a lever, E, by means of links *f*, which lever is pivoted to the rear cross-bar of frame A, and provided with a jointed handle, F. By these means a person walking behind the harrow can throw back the teeth free from the ground, leaving the harrow supported upon sled-runners *g*. G designates a chain, which is attached to the middle front tooth *a*, carried forward through an eye, *h*, and secured to a double-tree, J. It will thus be seen that the horses drawing the harrow will hold the teeth *a* in working position, when they are adjusted in such position. When the harrow-teeth are thrown up out of working position, as shown in Fig. 2, they may be thus held by any convenient device.

What I claim as new, and desire to secure by Letters Patent, is—

The rocking bar C′, armed with teeth *a*, and connected with the whiffletree J by the chain G, in combination with the connecting-bar D, chain *c*, and rocking bars C, substantially as described.

In testimony that I claim the above I have hereunto subscribed my name in the presence of two witnesses.

AYRES ROSS.

Witnesses:
GEO. F. LEWIS,
J. B. CARY.